United States Patent [19]

Ishiguro

[11] Patent Number: 5,581,315
[45] Date of Patent: Dec. 3, 1996

[54] CAMERA WITH BUILT-IN PHOTOFLASH UNIT

[75] Inventor: Minoru Ishiguro, Saitama-ken, Japan

[73] Assignee: Fuji Photo Optical Co., Ltd., Saitama-Ken, Japan

[21] Appl. No.: 519,260

[22] Filed: Sep. 6, 1995

[30] Foreign Application Priority Data

Oct. 20, 1994 [JP] Japan .................................. 6-255611

[51] Int. Cl.$^6$ .................................. G03B 15/02
[52] U.S. Cl. .................................. 396/176; 396/201
[58] Field of Search .................. 354/127.1, 127.11, 354/127.12, 149.11

[56] References Cited

U.S. PATENT DOCUMENTS 5,210,560  5/1996  Labaziewicz .......................... 354/268

FOREIGN PATENT DOCUMENTS

54-47644  4/1979  Japan .

*Primary Examiner*—Michael L. Gellner
*Assistant Examiner*—Eric Nelson
*Attorney, Agent, or Firm*—Leydig, Voit & Mayer

[57] ABSTRACT

A camera with a built-in photoflash unit comprises a camera body; a photoflash unit; a detection electrode for detecting a capacitance added thereto and detecting an induced voltage generated therein by flashing of the photoflash unit; control means for detecting a change in the capacitance or the induced voltage caused in the detection electrode; and display means for informing that the window is blocked or that the photoflash unit flashed. The camera has both functions to inform that a photographer's finger is blocking the window of the photoflash unit and to inform that the photoflash unit normally operated to flash.

4 Claims, 8 Drawing Sheets

CAMERA WITH BUILT-IN PHOTOFLASH UNIT

BACKGROUND OF THE INVENTION

1. Field of the Invention

The present invention relates to a camera with a built-in photoflash unit or electronic flash (so-called "strobe"), and more particularly to a camera with a built-in photoflash unit which permits a photographer to readily check whether or not the photoflash unit operated to flash.

2. Related Background Art

Developed heretofore are photoflash-unit-including cameras provided with an automatic photoflash unit for automatically emitting light when it is dark, so as to permit a beginner to readily take pictures. The conventional cameras with a built-in photoflash unit, however, had a problem that when a photographer's finger touched an emission window of the photoflash unit, a quantity of emitted light became insufficient so as to darken a picture, and a problem that it was difficult for the photographer to check whether the photoflash unit normally emitted the light.

SUMMARY OF THE INVENTION

An object of the present invention is to provide a camera with a built-in photoflash unit which is provided with a function to inform the photographer that a photographer's finger or the like is blocking at least a part of the window for light emission of the photoflash unit (hereinafter referred to as a "finger touch alarm function") and a function to inform the photographer that the photoflash unit normally operated to flash (hereinafter referred to as a "flash checking function") and which is compact in size, light in weight, and low in cost.

A camera with a built-in photoflash unit according to the present invention, comprises:

a camera body having an aperture portion;

a photoflash unit provided with a flashing portion having a window for flashing, the window being disposed in the aperture portion;

a detection electrode fixed to the camera body through an insulating member, which covers a surface of the detection electrode, and disposed in or near the window, the detection electrode being provided for detecting a capacitance added through the insulating member to the detection electrode and an induced voltage generated in the detection electrode by a change of an electric field caused by the flashing portion of the photoflash unit upon flashing;

control means for detecting a change in the capacitance or a change in the induced voltage caused in the detection electrode to generate a signal; and display means driven based on the signal generated by the control means, the display means informing that the window is blocked or that the phohotoflash unit flashed In the camera of the present invention, the display means preferably comprises:

first display means driven based on the first signal generated from the control means and informing that the window is blocked; and second display means driven based on the second signal generated from the control means and informing that the photoflash unit flashed. In this case, the control means detects a change in the capacitance caused in the detection electrode to generate a first signal and detects a change in the induced voltage caused in the detection electrode to generate a second signal.

An embodiment of the camera of the present invention further comprises a correction electrode fixed through an insulating plate on an inner surface of the camera body and disposed at a position more distant from the flashing portion than the detection electrode, the correction electrode being provided for detecting a capacitance added through the insulating plate and the camera body to the correction electrode and an induced voltage generated in the correction electrode by a change in the electric field caused by the flashing portion of the photoflash unit upon flashing.

In an embodiment of the above camera of the present invention, the control means further comprises a signal generating portion for generating a pulse signal periodically inverted between a first state and a second state, a comparator having first and second input terminals, wherein the detection electrode and an output terminal of the signal generating portion are connected in parallel to the first input terminal and wherein the correction electrode and the output terminal of the signal generating portion are connected in parallel to the second input terminal, the comparator outputting a signal which holds a first state when a voltage level of a pulse signal input into the first input terminal is not more than a voltage level of a pulse signal input into the second input terminal and which holds a second state when a voltage level of a pulse signal input into the first input terminal is higher than a voltage level of a pulse signal input into the second input terminal, and a latch portion having third and fourth input terminals, wherein an output terminal of the comparator is connected to the third input terminal and wherein the output terminal of the signal generating portion is connected to the fourth input terminal, the latch portion generating a signal to the display means during a period of from a first time when the signal output from the comparator and input into the third input terminal is inverted from the first state to the second state to a second time when a state of a pulse signal output from the signal generating portion and input into the fourth input terminal at the first time is inverted.

Also in an embodiment of the above camera of the present invention, the display means preferably comprises the first and second display means. In this case, the control means further comprises a switching circuit for switching the signal generated from the latch portion between the first signal to-be supplied to the first display means and the second signal to-be supplied to the second display means.

In the camera with the built-in photoflash unit of the present invention, the capacitance of the detection electrode increases when a photographer's finger or the like touches the insulating member covering the surface of the detection electrode (on that occasion, the photographer's finger or the like covers at least a part of the window for flashing of the photoflash unit). Further, when the photoflash unit flashes where a photographer's finger does not touch the insulating member on the surface of the detection electrode, a high voltage is applied in a moment to the reflector of the photoflash unit, and the high voltage changes the electric field around the photoflash unit to generate an induced voltage in the detection electrode. Accordingly, the camera with the built-in photoflash unit of the present invention permits to detect both that a photographer's finger or the like blocks at least a part of the window for flashing of the photoflash unit and that the photoflash unit flashed normally, by detecting an increase in the capacitance and an increase in the induced voltage through the detection electrode.

More specifically, if either one of the above factors increases the voltage of the detection electrode, the voltage level increases in the first input terminal of the comparator to which the detection electrode is connected. On this occasion, the potential of the correction electrode also increases, but the increase of the potential in the correction electrode is smaller because the correction electrode is more distant from the reflector than the detection electrode. Thus, the voltage level of the second input terminal of the comparator to which the correction electrode is connected becomes not so high, so that a difference is made between the two voltage levels. Thus, the output signal from the comparator is inverted from the first state to the second state to be supplied to the third input terminal of the latch portion.

Further, the pulse signal from the signal generating portion is supplied to the fourth input terminal of the latch portion, and the latch portion causes the display means to display a predetermined detection information during a period of the time (first time) when the signal output from the comparator and input into the third input terminal is inverted from the first state to the second state to the time (second time) when the state of the pulse signal output from the signal generating portion and input into the fourth input terminal at the first time is inverted. Namely, even if the period of from the time when the output signal from the comparator is inverted from the first state to the second state to the time when it returns to the first state is very short, if the period of inversion of the pulse signal has a certain length, the latch portion displays the above predetermined detection information in the display means also during the period after the output signal from the comparator is inverted from the second state to the first state and before the pulse signal is inverted.

Incidentally, if the time during which a photographer's finger touches the insulating member on the surface of the detection electrode is short or if flashing of the photoflash unit is short, an increase in the potential of the detection electrode is small, so that the period during which the output signal from the comparator holds the second state becomes very short. However, according to the camera of the present invention, the latch portion extends the period for holding the second state even in such cases, whereby the period during which the above detection information is displayed on the display means becomes extended. Thus, the photographer can sufficiently and accurately check the detection information displayed on the display means.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
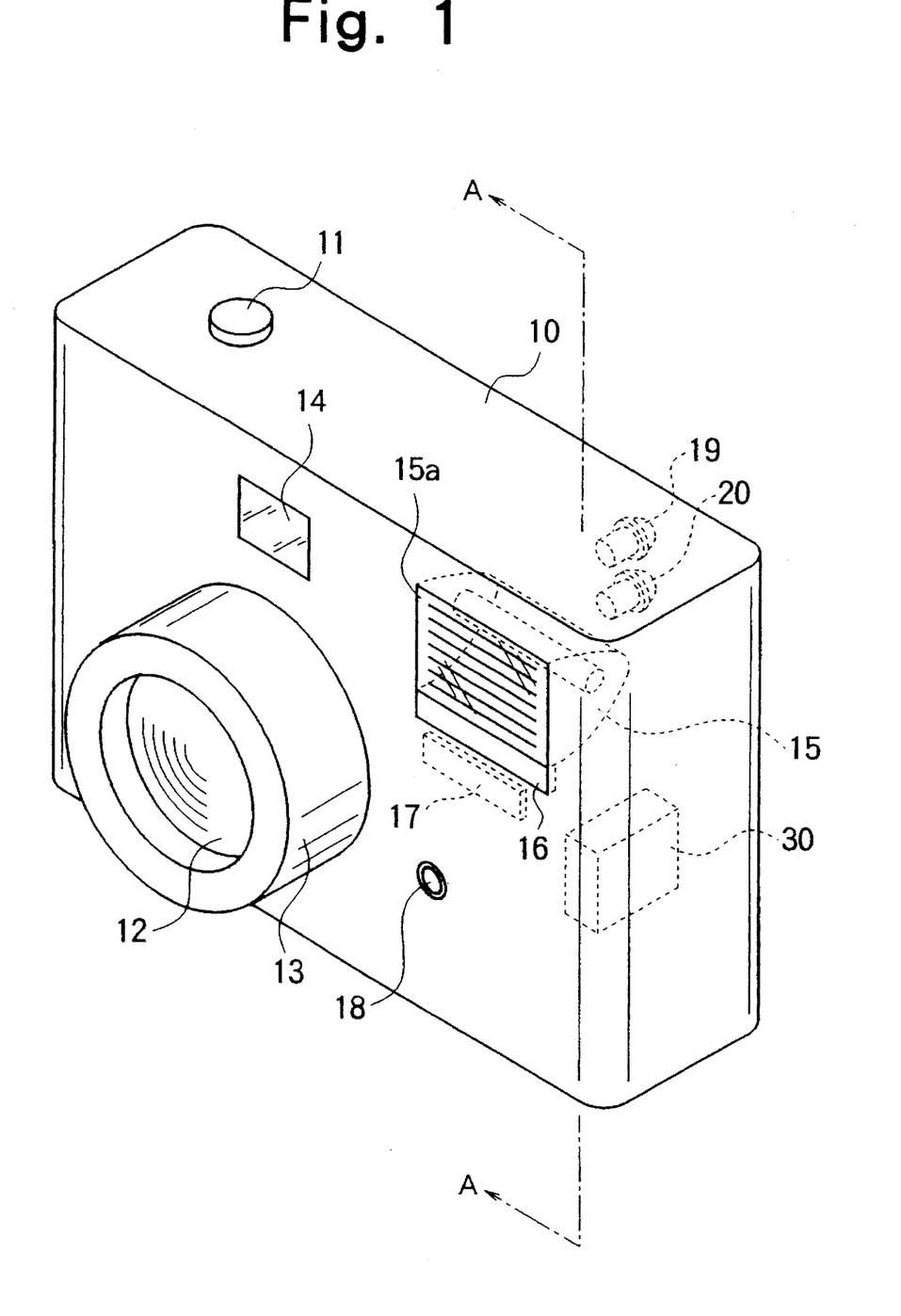
FIG. 1 is a perspective view to show the appearance of an example of a camera with a built-in photoflash unit according to the present invention.

The embodiments of the present invention will be explained by reference to the accompanying drawings. FIG. 1 is a perspective view to show the appearance of a camera with a built-in photoflash unit according to an embodiment of the present invention. Referring FIG. 1, the camera with the built-in photoflash unit of the present embodiment is so constructed that a shutter release button 11 is disposed on the top surface of a rectangular parallelepiped camera body 10 and that a lens barrel 13 in which lenses 12 are incorporated is mounted in the central portion of the front surface of the camera body 10. The camera body 10 is made of an electrically conductive material, for example such as aluminum, titanium, or nickel alloy, in order to add a quality appearance or durability thereto. A viewfinder 14 and a diffuser 15a of a flashing portion 15 of the photoflash unit are disposed in the upper part of the front surface of the camera body 10, and a touch sensor 16 for sensing a touch of a finger or the like is incorporated in the upper part as adjacent to and below the diffuser 15a. Further, a correction electrode portion 17 and an exposure metering unit 18 for measuring a luminance of a subject are arranged below the touch sensor 16.

Provided as display means on the back surface of the camera body 10 are a LED (hereinafter referred to part of the diffuser 15a is blocked by a photographer's finger or the like and a LED (hereinafter referred to as a "second LED") 20 for indicating that the photoflash unit normally operated to flash. The first LED 19 is turned on when a photographer's finger touches the window 15a of the photoflash unit 15; the second LED 20 is turned on when the photoflash unit 15 operated to flash. These lighting operations are controlled by a lighting control circuit 30 provided inside the camera body 10.

Figure 2:
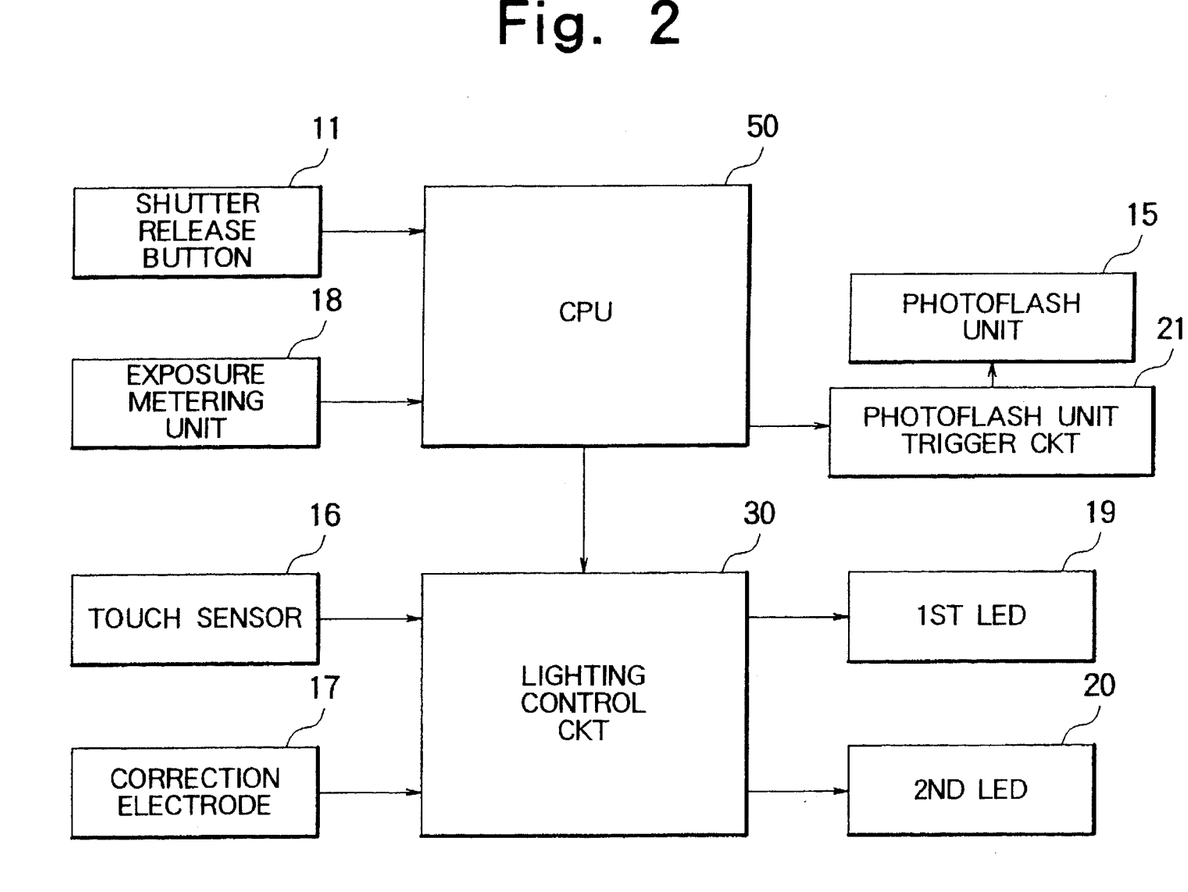
FIG. 2 is a block diagram to show the structure of the example of the camera with the photoflash unit according to the present invention.

As shown in the block diagram of FIG. 2, the flashing control of the flashing portion 15 is executed by a CPU 50 installed in the camera body 10. The CPU 50 receives from the shutter release button 11 a signal to indicate that the button 11 is half-pressed (a signal to instruct start of focusing, which will be referred to as a "half-press signal") and a signal to indicate that the button 11 is fully pressed (a signal to instruct start of shutter release, which will be referred to as a "full-press signal"). Also supplied to the CPU 50 is a luminance signal of the subject measured by the exposure metering unit 18 as described above. Receiving the half-press signal from the shutter release button 11, the CPU 50 checks the luminance signal from the exposure metering unit 18. If the CPU determines from this signal that the subject is dark, it sends a flash signal through a photoflash-unit trigger circuit 21 to the flashing portion 15 at a timing when the full-press signal is supplied from the shutter release button 11.

Also, the CPU 50 sends a signal to turn the lighting control circuit 30 into an on state thereto. When the lighting control circuit 30 is turned on, it detects a shift of the phase of a pulse signal due to a change in capacitance of the touch sensor 16. When the lighting control circuit 30 detects a shift of the phase, it outputs a control signal to the first LED 19 or the second LED 20.

Figure 3:
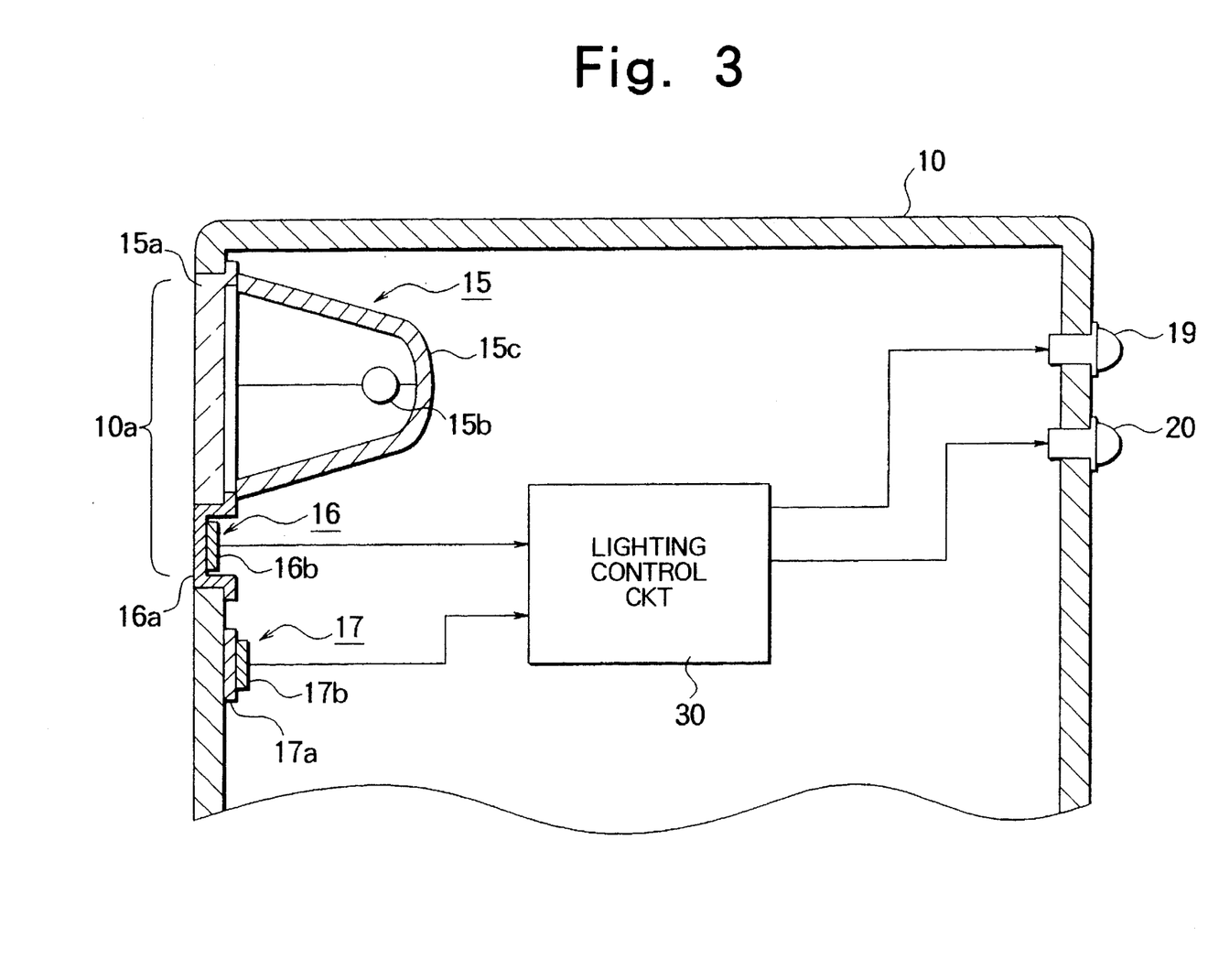
FIG. 3 is a partial cross section of the example of the camera with the built-in photoflash unit according to the present invention.

FIG. 3 is a partial cross section (A—A section in FIG. 1), taken normal to the front surface, of the portion including the photoflash unit in the photoflash-unit-including camera of the present embodiment. In FIG. 3, the flashing portion 15 is composed of a xenon tube 15b for emitting flash light, a reflector 15c for reflecting the flash light toward the front surface, and the diffuser 15a for protecting the xenon tube 15b and diffusing the flash light so as to match a taking range. The diffuser 15a is attached to the upper edge of an aperture portion 10a formed in the upper part of the front surface of the camera body 10, and a front surface of the diffuser is exposed to the outside of the camera body 10.

The touch sensor 16 is composed of an insulating plate 16a consisting of a molded product of a resin etc., and a detection electrode 16b which is made of an electrically conductive member of a plate and a surface of which is covered by the insulating plate 16a. The insulating plate 16a has a shape as bent stepwise at the both edges, and the lower step portion is mounted to the lower edge of the aperture portion 10a so that the lower end of the insulating plate 16a is in contact with the inside of the camera body 10. Also, the upper step portion of the insulating plate 16a is mounted to the bottom portion of the diffuser 15a, and a surface of the insulating plate 16a is exposed to the outside of the camera body 10 between the lower edge of the aperture portion 10a and the diffuser 15a. Since one surface of the insulating plate 16a is exposed in this manner, a capacitance of the photographer is applied through the insulating plate 16a to the detection electrode 16b when a photographer's finger touches the exposed surface.

The correction electrode portion 17 is composed of an insulating plate 17a consisting of a molded product of a resin etc. and disposed on the inner surface of the camera body 10, and a correction electrode 17b made of an electrically conductive member of a plate and disposed on the insulating plate 17a. Since the insulating plate 17a and correction electrode 17b are arranged in double layers on the inner surface of the camera body 10 in this manner the capacitance of the photographer gripping the camera body 10 is applied through the camera body 10 and insulating plate 17a to the correction electrode 17b.

The first LED 19 and second LED 20 are disposed up and down on the back surface of the camera body 10. Voltage signals from the detection electrode 16b and correction electrode 17b are supplied to the lighting control circuit 30 set in the camera body 10. Receiving these signals; the lighting control circuit 30 executes processing for detecting a touch of a photographer's finger on the diffuser 15a of the flashing portion 15 and processing for detecting flash emission of the flashing portion 15. Then the lighting control circuit 30 outputs a control signal (first signal or second signal) to either one of the first LED 19 and second LED 20, depending upon results of these processing, to turn on either LED.

Figure 4:
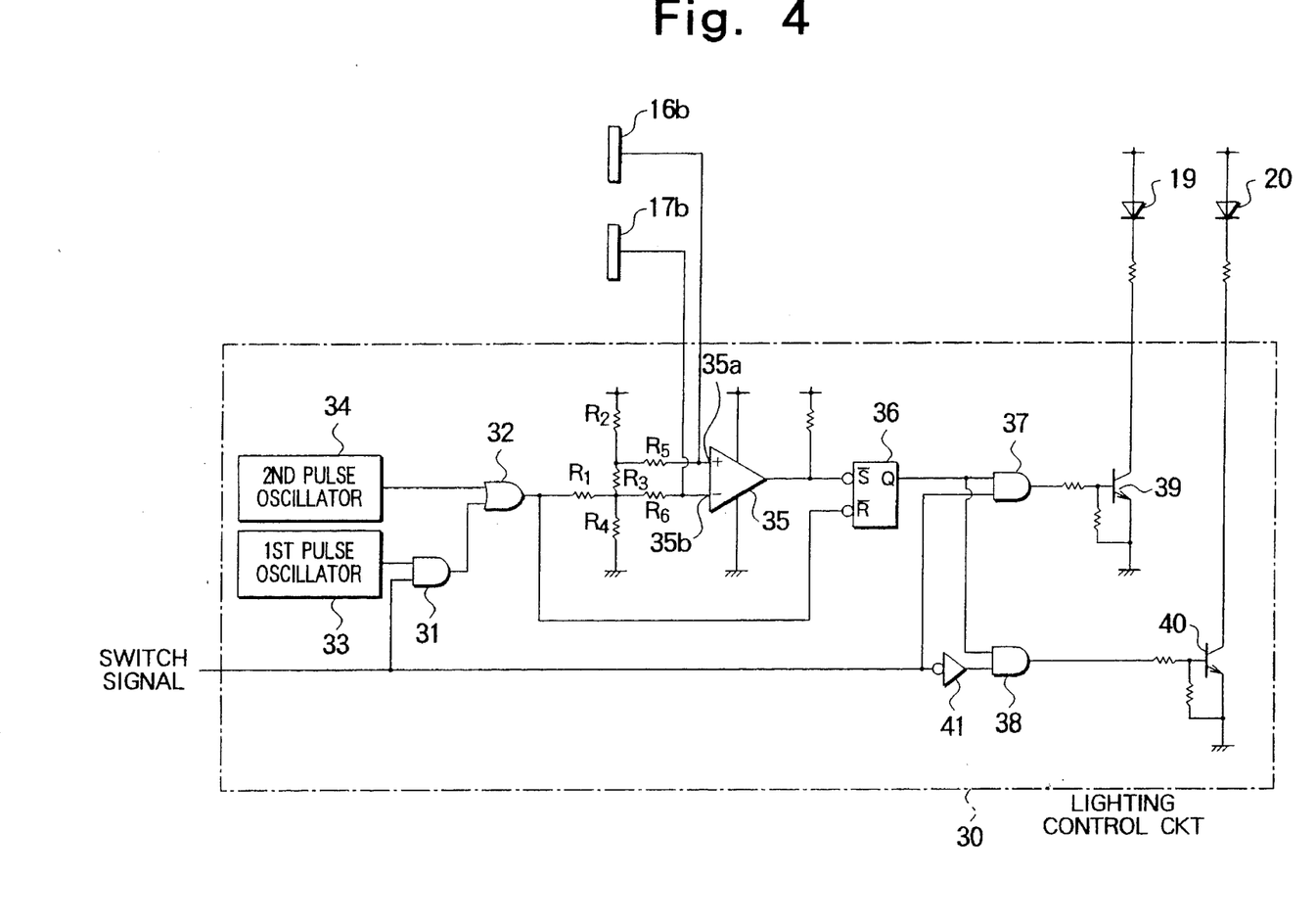
FIG. 4 is a circuit diagram to show the details of an example of a lighting control circuit according to the present invention.
Figure 5:
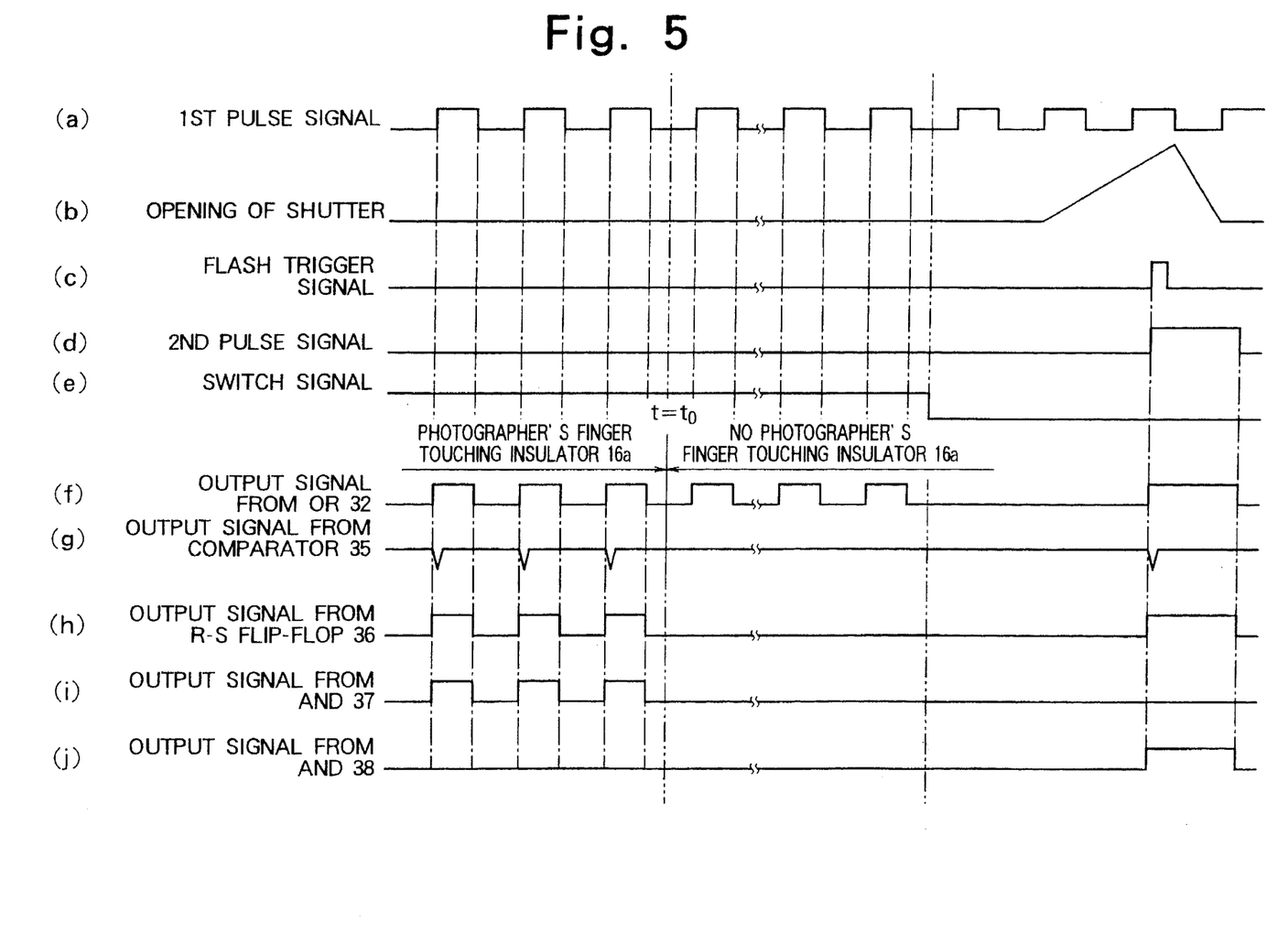
FIG. 5 is a waveform diagram to show the details of processing in the example of the lighting control circuit according to the present invention.
Figure 6:
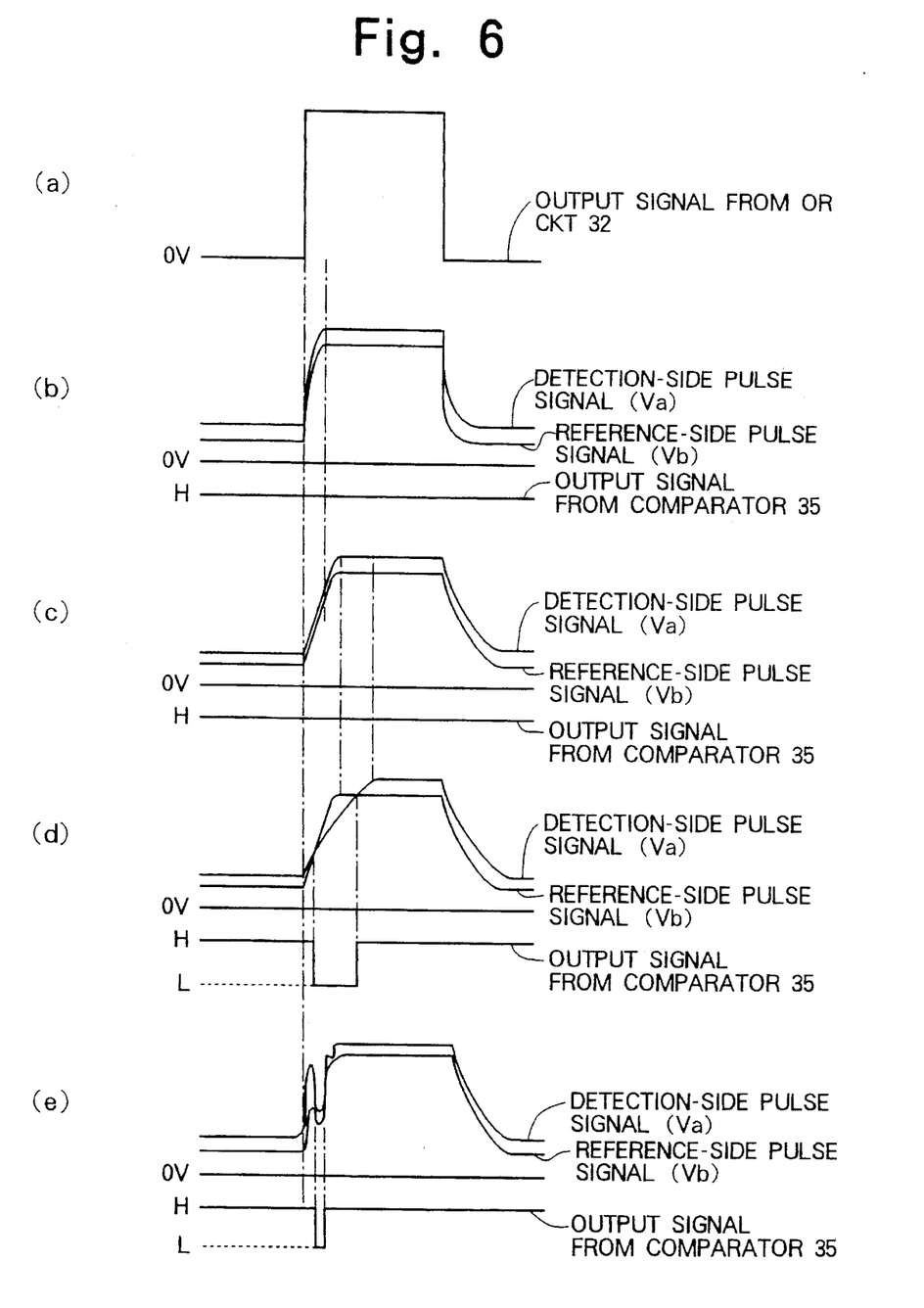
FIG. 6 is a waveform diagram to show principles of finger touch detection and photoflash detection in a comparator according to the present invention.

The processing of the lighting control circuit 30 are next explained using the circuit diagram of FIG. and the waveform diagrams of FIGS. 5 and 6. Referring to the circuit diagram of FIG. 4, the lighting control circuit 30 has an AND circuit 31 and an OR circuit 32, and the AND circuit 31 receives a switch signal from the CPU 50 and a first pulse signal from an oscillator (hereinafter referred to as a "first pulse oscillator") 33 for generating a pulse signal (hereinafter referred to as a "first pulse signal") for detecting whether at least a part of the diffuser 15a is blocked by a photographer's finger or the like. Further, the OR circuit 32 receives an output signal from the AND circuit 31 and a second pulse signal from an oscillator (hereinafter referred to as a "second pulse oscillator") 34 for generating a pulse signal (hereinafter referred to as a "second pulse signal") for detecting whether the photoflash unit normally operated to flash. An output signal from the OR circuit 32 is potential-divided by resistors R1–R4 into two pulse signals of a detection-side pulse signal and a reference-side pulse signal. The detection-side pulse signal is input through a resistor R5 into a non-inverting input terminal 35a of a comparator 35, and the reference-side pulse signal is input through a resistor R6 into an inverting input terminal 35b of the comparator 35. The detection electrode 16b is connected to the non-inverting input terminal 35a, so that the resistor R5 and the capacitance of the detection electrode 16b form a CR circuit, which functions as a delay circuit for the detection-side pulse signal.

Further, the correction electrode 17b is connected to the inverting input terminal 35b, so that the resistor R6 and the capacitance of the correction electrode 17b compose a delay circuit for the reference-side pulse signal. The capacitance of the correction electrode 17b and the resistance of the resistor R6 are set to such respective values as to avoid erroneous detection of a finger touch (blocking of the diffuser 15a by finger) when the photographer holds the camera body 10 properly without touching the touch sensor 16. In detail, because the electrically conductive camera body 10 is located close to the detection electrode 16b, the photographer's capacitance poses an effect through the camera body 10 on the detection electrode 16b even when the photographer correctly holds the camera body 10. Thus, the detection-side pulse signal involves a delay of the phase. Then the phase of the reference-side pulse signal is arranged to be delayed by the correction electrode 17b and resistor R5 to the same extent as the phase delay in the above case where the photographer correctly holds or to such an extent as to be delayed slightly more than it. This arrangement assures that the detection-side pulse signal will not lag behind the reference-side pulse signal unless the photographer touches the touch sensor 16, thereby being capable of preventing erroneous detection of finger touch.

An output signal from the comparator 33 is input into an S input terminal of an R-S flip-flop (bistable multivibrator) 36, and an output signal from the OR circuit 32 is input into an R input terminal of the R-S flip-flop 36. Then an output signal from the R-S flip-flop 36 is input into one input terminal of an AND circuit 37 and one input terminal of an AND circuit 38. Further, the switch signal from the CPU 50 is input into the other input terminal of the AND circuit 37, and an inverted signal of the switch signal into the other input terminal of the AND circuit 38.

An output signal (first signal) from the AND circuit 37 is input into the base of a transistor 39 for stabilizing a current flow, and a collector output from the transistor 39 is input into the first LED 19. An output signal (second signal) from the AND circuit 38 is input into the base of a transistor 40 for stabilizing a current flow, and a collector output from the transistor 40 is input into the second LED 20.

Referring now to the waveform diagram of FIG. 5, the first pulse signal output from the first pulse oscillator 33 is a pulse signal which periodically repeats states of the H level and the L level (FIG. 5(a)). The second pulse signal output from the second pulse oscillator 34 is a pulse signal which is inverted from the L level to the H level in synchronization with a photoflash trigger signal to become the H level at the timing of release of shutter and which maintains the H level before the shutter is closed (FIG. 5(b) to (d)).

The CPU 50 outputs the switch signal for switching lighting between the first LED 19 and the second LED 20. Lighting of the first LED 19 becomes possible when the switch signal is in the H level; lighting of the second LED 20 becomes possible when the switch signal is in the L level (FIG. 5(e)).

While the switch signal from the CPU 50 is in the H level, the AND circuit 31 outputs the first pulse signal. Since the second pulse signal is in the L level during this period, the output signal from the OR circuit 32 is the same signal as the first pulse signal. After the switch signal from the CPU 50 is turned into the L level, the AND circuit 31 outputs a signal of the L level, and the output signal from the OR circuit 32 is the same signal as the second pulse signal (FIG. 5(f)). The output signal from the OR circuit 32 is potential-divided by the resistors R1–R4 into the two pulse signals of the detection-side pulse signal and the reference-side pulse signal.

These pulse signals are input into the comparator 35, and the voltage signals from the detection electrode 16b and correction electrode 17b are further applied thereto, whereby the comparator 35 operates as shown in the waveform diagram of FIG. 6. The operation of the comparator 35 is next explained referring to FIG. 6. The output signal from the OR circuit 32 is potential-divided by the resistors R1–R4 into the two signals, one of which is input as the detection-side pulse signal through the resistor R5 into the non-inverting input terminal 35a and the other of which is input as the reference-side pulse signal through the resistor R6 into the inverting input terminal 35b (FIG. 6(a)).

For example, under such a condition that the camera body 10 is fixed on a tripod or the like and that no hand touches the camera body 10; waveforms of the respective pulse signals (changes of voltages Va, Vb) input into the non-inverting input terminal 35a and the inverting input terminal 35b have sharp rising edges, and the phases of the respective pulse signals as reaching their peak voltages each lag behind the output signal from the OR circuit 32.

This is because as to the detection-side pulse signal, the capacitance of the detection electrode 16b itself and the resistor R5 form the delay circuit, which makes a rise of a pulse in the detection-side pulse signal dull. Further, as to the reference-side pulse signal, the capacitance of the correction electrode 17b itself and the resistor R6 form the delay circuit, which makes a rise of a pulse dull. The delay circuit formed by the correction electrode 17b and resistor R6 delays the phase of the reference-side pulse signal as reaching the peak voltage by the same level as the delay of the phase of the detection-side pulse signal as reaching the peak voltage, by the capacitance of the detection electrode 16b itself, or the phase delay of the reference-side pulse signal is slightly greater than that of the detection-side pulse signal. Thus, the voltage Va of the detection-side pulse signal and the voltage Vb of the reference-side pulse signal are kept in the relation of Va>Vb, and no phase difference is detected, thereby maintaining the output signal from the comparator 35 in the H level (FIG. 6(b)).

While the photographer holds the camera body 10 without touching the insulating plate 16a, the capacitance of the photographer is added through the camera body 10 and the insulating plate 16a to the detection electrode 16b. Also, the capacitance of the photographer is added through the camera body 10 and the insulating plate 17a to the correction electrode 17b. This makes the rises of the detection-side pulse signal and the reference-side pulse signal further duller than those in the state shown in FIG. 6 (b), thereby causing more delays of the phases reaching the peak voltages. Since the capacitance added to the correction electrode 17b on this occasion is adjusted to become equal to or slightly larger than the capacitance added to the detection electrode 16b by properly selecting the size and the mount position of the correction electrode 17b, the phases of the detection-side pulse signal and the reference-side pulse signal reaching their peak voltages are the same or the phase of the reference-side pulse signal slightly lags from that of the detection-side pulse signal. Accordingly, the voltages of the respective signals are maintained in the relation of Va>Vb, thus maintaining the output signal from the comparator 35 in the H level (FIG. 6 (c)).

If the photographer holds the camera body 10 and if a finger blocks at least a part of the diffuser 15a, that is, in the condition that a finger is touching the insulating plate 16a, the capacitance of the photographer is added to the detection electrode 16b via a path passing directly through the insulating plate 16a and via a path passing through the camera body 10 and insulating plate 16a. This makes the rising part of the pulse in the detection-side pulse signal further duller than that shown in FIG. 6(c), and makes it duller than that of the reference-side pulse signal. Accordingly, while rising of pulse, the voltage Va of the detection-side pulse signal and the voltage Vb of the reference-side pulse signal are temporarily kept in the relation of Va<Vb, thus temporarily changing the output signal from the comparator 35 from the H level to the L level (FIG. 6(d)).

When the flashing portion 15 flashes with no photographer's finger touching the insulating plate 16a, a high voltage of some kV to some ten kV is applied in a moment from the photoflash-unit trigger circuit 21 to the reflector 15c of the photoflash unit. On this occasion, the reflector 15c causes a change of the electric field in the surroundings and this change of the electric field generates an induced voltage in the detection electrode 16b. Since the correction electrode 17b is more distant from the reflector 15c than the detection electrode 16b (i.e., because a distance between the reflector 15c and the correction electrode 17b is greater than that between the reflector 15c and the detection electrode 16b), an induced voltage generated in the correction electrode 17b is less than that in the detection electrode 16b. Thus, there appears a period during which the oscillation of the detection-side pulse signal is greater than that of the reference-side pulse signal, and in this period the voltage Va of the detection-side pulse signal and the voltage Vb of the reference-side pulse signal are kept in the relation of Va<Vb, thus temporarily changing the output signal from the comparators 35 from the H level to the L level (FIG. 6(e)).

Supposing a photographer's finger touches the insulating plate 16a during a period before time $t_0$ has elapsed and the photographer's finger leaves the insulating plate 16a at time $t_0$, the output signal from the comparator 35 becomes as shown in FIG. 5(g). Namely, during the period before the time $t_0$, the output signal from the comparator 35 is temporarily inverted from the H level to the L level at timings when the output signal from the OR circuit 32 is inverted from the L level to the H level. After a lapse of the time $t_0$, the state of FIG. 6(e) will not appear unless the flashing portion 15 flashes, and thus the output signal from the comparator 35 is maintained in the H level.

When the photoflash-unit trigger signal is turned into the H level to actuate the flashing portion 15, a high voltage of some kV to some ten kV is applied in a moment to the reflector 15c of the photoflash unit, and this high voltage changes the electric field around the reflector 15c to generate the induced voltage in the detection electrode 16b. Thus, the state of FIG. 6(e) is established to temporarily invert the output signal from the comparator 35 from the H level to the L level.

The output signal (FIG. 5(g)) from the comparator 35 is input into the S input terminal of the R-S flip-flop 36. Also, the output signal (FIG. 5(f)) from the OR circuit 32 is input into the R input terminal of the R-S flip-flop 36. Thus, the R-S flip-flop 36 outputs a signal which is inverted from the L level to the H level at timings when the output signal from the comparator 35 is inverted from the H level to the L level and which is maintained in the H level during periods during which the output signal from the OR circuit 32 is maintained in the H level (FIG. 5(h)).

The output signal from the R-S flip-flop 36 is supplied to the one input terminal of each of the AND circuits 37, 38. Since the switch signal is supplied to the other input terminal of the AND circuit 37, the AND circuit 37 outputs a signal to be maintained into the H level while both the output signal from the R-S flip-flop 36 and the switch signal are in the H level (FIG. 5(i)). This signal is supplied to the first LED 19 to turn on the first LED 19 during periods during which the signal is in the H level. Similarly, since the inverted signal (inverted by a NOT circuit 41) of the switch signal is supplied to the other input terminal of the AND circuit 38, the AND circuit 38 outputs a signal to be maintained into the H level while the output signal from the R-S flip-flop 36 is in the H level and the switch signal is in the L level (FIG. 5(j)). This signal is supplied to the second LED 20 to turn on the second LED 20 during a period during which the signal is in the H level.

As described, even if a period during which the output signal from the comparator 35 holds the L level is short, the R-S flip-flop 36 extends this period and outputs the signal during the extended period. Then the output signal is used for lighting control of the first LED 19 and second LED 20. For example, if the time period during which the photographer's finger touches the insulating plate 16a is short or if flash of the photoflash unit is short, the induced voltage applied to the detection electrode 16b is low, so that the period during which the output signal from the comparator 35 holds the L level becomes very short. Even in such cases, the R-S flip-flop 36 secures a certain period for lighting of the first LED 19 and second LED 20, thus permitting the photographer to sufficiently and accurately recognize lighting of the first LED 19 and/or second LED 20.

Figure 7:
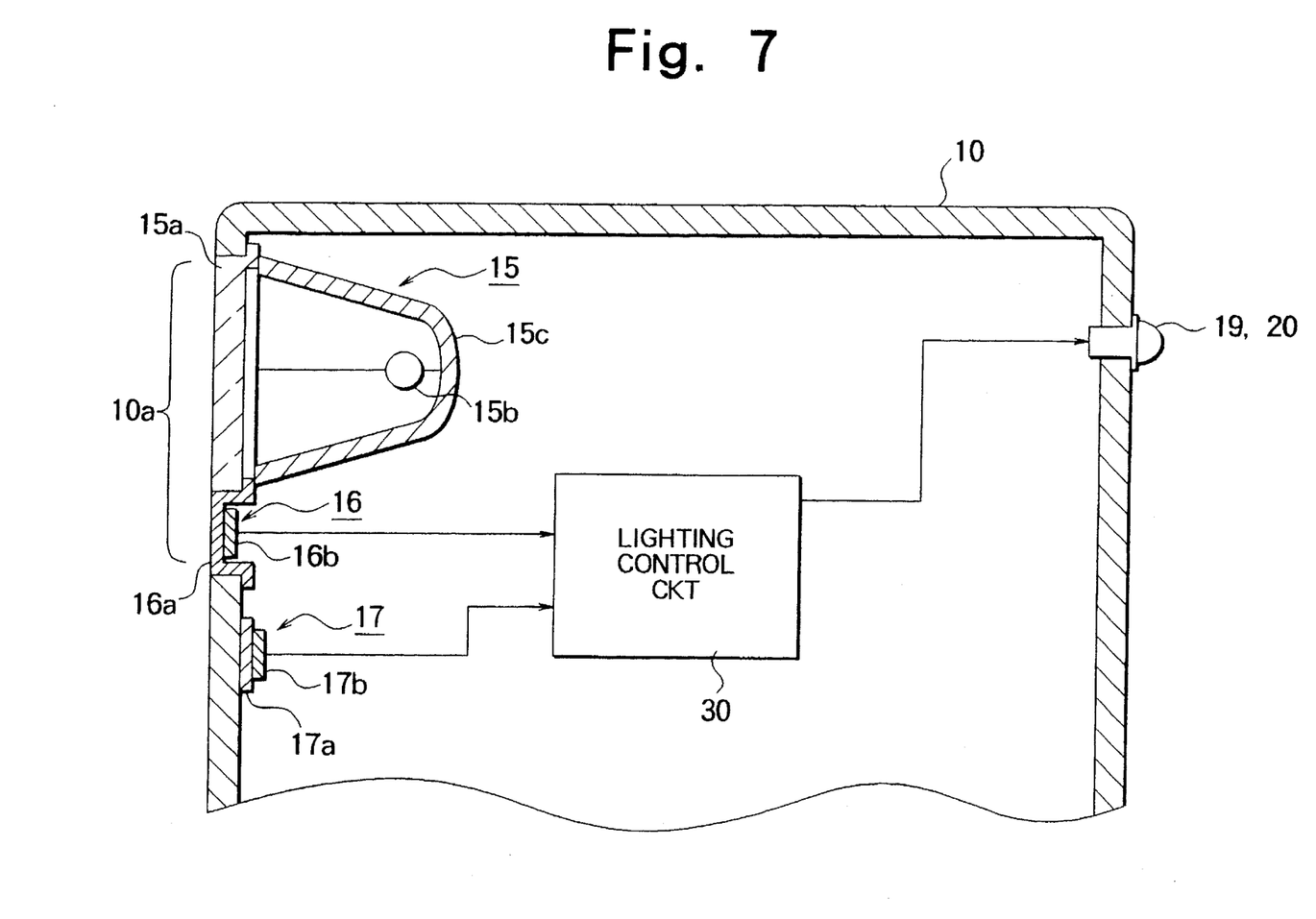
FIG. 7 is a partial cross section of another example of the camera with the built-in photoflash unit according to the present invention.

Although the above embodiment is so arranged that the two LEDs, the first LED 19 and the second LED 20, are provided as display means and that the LED turned on upon detection of finger touch is different from that upon detection of flash of the photoflash unit, a single LED 19, 20 as shown in FIG. 7 may be arranged to be turned on for the both purposes. The display means is not limited to the LED, but another display device such as a liquid crystal display or a plasma display may be used.

Figure 8:
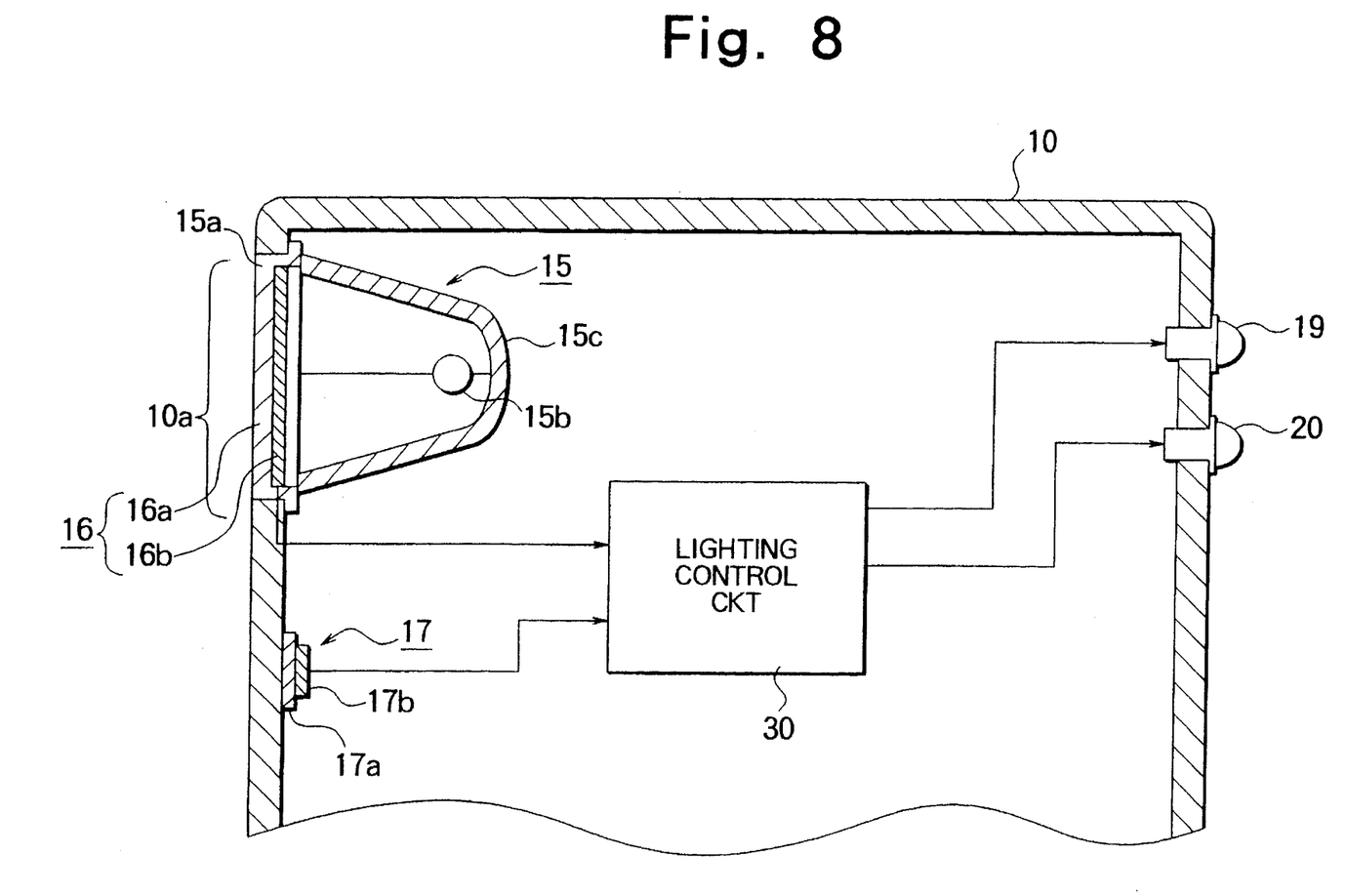
FIG. 8 is a partial cross section of still another example of the camera with the built-in photoflash unit according to the present invention.

Further, the present embodiment is so arranged that the touch sensor 16 is incorporated below the diffuse 15a of the flashing portion 15, but the diffuser 15a may be constructed as a touch sensing portion as shown in FIG. 8. In this case, a preferred arrangement is such that the diffuser 15a is a transparent and electrically conductive film (a laminate plate of a transparent and electrically insulating film 16a and a transparent and electrically conductive film 16b) whereby the diffuser 15a itself becomes a detection electrode (touch sensing portion 16).

The above embodiment was explained as to the camera including the conductive camera body 10, but the camera body may be non-conductive. If with a non-conductive camera body a camera has a metal part, a screw, etc. exposed to the outside and when the photographer touches the part, screw, etc. as holding the camera a possibility of erroneous detection of finger touch becomes high, equivalent to the cases where the photographer touches the conductive camera body. The present invention is also effective to correct detection of finger touch even in such cases.

As detailed above, because the camera with the built-in photoflash unit of the present invention uses the common circuit to the checking function of flash of the photoflash unit and the alarm function of finger touch, the number of parts is decreases the camera is made compact and lights and the cost is reduced.

In the camera with the built-in photoflash unit of the present invention, the comparator detects a difference between the capacitance added through the insulating member to the detection electrode and the capacitance added through the camera body and the insulating plate to the correction electrode. Namely, if a photographer's finger touches the insulating member on the surface of the detection electrode to increase the capacitance of the detection electrode or if flash of the photoflash unit applies an induced voltage to the detection electrode, the output signal from the comparator temporarily holds the second state. This output signal is input into the latch portion, which functions to extend the period during which the input signal holds the second state, if it is short. Then the latch portion displays specific information of the above detection in the display means for the thus extended period.

If the time during which a photographer's finger touches the insulating member covering the surface of the detection electrode is short or if flash of the photoflash unit is short, an increase in the potential of the detection electrode is small, so that the period during which the output signal from the comparator holds the second state becomes very short. However, the latch portion extends the period for holding the second state even in such cases, thereby extending the period for displaying the detection information in the display means. Therefore, the photographer can sufficiently and accurately check the detection information displayed on the display means.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.255611/1994 filed on Oct. 20, 1994 is hereby incorporated by reference.

What is claimed is:

1. A camera with a built-in photoflash unit, comprising:

a camera body having an aperture portion;

a photoflash unit provided with a flashing portion having a window for flashing, said window being disposed in said aperture portion;

a detection electrode fixed to said camera body through an insulating member, which covers a surface of the detection electrode; and disposed in or near said window, said detection electrode being provided for detecting a capacitance added through said insulating member to said detection electrode and an induced voltage generated in said detection electrode by a change of an electric field caused by the flashing portion of the photoflash unit upon flashing;

control means for detecting a change in the capacitance or a change in the induced voltage caused in said detection electrode to generate a signal; and display means driven based on the signal generated by said control means, said display means informing that said window is blocked or that said photoflash unit flashed.

2. A camera according to claim 1, further comprising a correction electrode fixed through an insulating plate on an inner surface of said camera body and disposed at a position more distant from said flashing portion than said detection electrode, said correction electrode being provided for detecting a capacitance added through said insulating plate and said camera body to said correction electrode and an induced voltage generated in said correction electrode by a change of an electric field caused by the flashing portion of the photoflash unit upon flashing;

wherein said control means further comprises a signal generating portion for generating a pulse signal periodically inverted between a first state and a second state, a comparator having first and second input terminals, wherein said detection electrode and an output terminal of said signal generating portion are connected in parallel to said first input terminal and wherein said correction electrode and the output terminal of said signal generating portion are connected in parallel to said second input terminal, said comparator outputting a signal which holds a first state when a voltage level of a pulse signal input into said first input terminal is not more than a voltage level of a pulse signal input into said second input terminal and which holds a second state when a voltage level of a pulse signal input into said first input terminal is higher than a voltage level of a pulse signal input into said second input terminal, and a latch portion having third and fourth input terminals, wherein an output terminal of said comparator is connected to said third input terminal and wherein the output terminal of said signal generating portion is connected to said fourth input terminal, said latch portion generating a signal to said display means during a period of from a first time when the signal output from said comparater and input into said third input terminal is inverted from the first state to the second state to a second time when a state of a pulse signal output from said signal generating portion and input into said fourth input terminal at the first time is inverted.

3. A camera with a built-in photoflash unit, comprising:

a camera body having an aperture portion;

a photoflash unit provided with a flashing portion having a window for flashing, said window being disposed in said aperture portion;

a detection electrode fixed to said camera body through an insulating member, which covers a surface of the detection electrode, and disposed in or near said window, said detection electrode being provided for detecting a capacitance added through said insulating member to said detection electrode and an induced voltage generated in said detection electrode by a change of an electric field caused by the flashing portion of the photoflash unit upon flashing;

control means for detecting a change in the capacitance caused in said detection electrode to generate a first signal and detecting a change in the induced voltage caused in said detection electrode to generate a second signal;

first display means driven based on the first signal generated from said control means and informing that said window is blocked; and second display means driven based on the second signal generated from said control means and informing that said photoflash unit flashed.

4. A camera according to claim 3, further comprising a correction electrode fixed through an insulating plate on an inner surface of said camera body and disposed at a position more distant from said flashing portion than said detection electrode, said correction electrode being provided for detecting a capacitance added through said insulating plate and said camera body to said correction electrode and an induced voltage generated in said correction electrode by a change of an electric field caused by the flashing portion of the photoflash unit upon flashing;

wherein said control means further comprises a signal generating portion for generating a pulse signal periodically inverted between a first state and a second state, a comparator having first and second input terminals, wherein said detection electrode and an output terminal of said signal generating portion are connected in parallel to said first input terminal and wherein said correction electrode and the output terminal of said signal generating portion are connected in parallel to said second input terminal, said comparator outputting a signal which holds a first state when a voltage level of a pulse signal input into said first input terminal is not more than a voltage level of a pulse signal input into said second input terminal and which holds a second state when a voltage level of a pulse signal input into said first input terminal is higher than a voltage level of a pulse signal input into said second input terminal, a latch portion having third and fourth input terminals, wherein an output terminal of said comparator is connected to said third input terminal and wherein the output terminal of said signal generating portion is connected to said fourth input terminal, said latch portion generating a signal during a period of from a first time when the signal output from said comparator and input into said third input terminal is inverted from the first state to the second state to a second time when a state of a pulse signal output from said signal generating portion and input into said fourth input terminal at the first time is inverted, and a switching circuit for switching the signal generated from said latch portion between the first signal supplied to said first display means and the second signal supplied to said second display means.

* * * * *